United States Patent [19]
Bellaouar et al.

[11] Patent Number: 5,999,581
[45] Date of Patent: Dec. 7, 1999

[54] LOW-POWER DIRECT DIGITAL FREQUENCY SYNTHESIZER ARCHITECTURE

[75] Inventors: Abdellatif Bellaouar; Michael S. Obrecht; Mohamed I. Elmasry, all of Waterloo, Canada

[73] Assignee: University of Waterloo, Waterloo, Canada

[21] Appl. No.: 08/537,299

[22] Filed: Sep. 29, 1995

[51] Int. Cl.$^6$ .................................................. H04L 23/00
[52] U.S. Cl. .................... 375/377; 327/105; 327/106; 455/76; 708/271; 708/276
[58] Field of Search ................. 327/105, 106, 327/107; 455/76; 165.1, 183.1, 260; 348/538; 358/525; 364/577, 723, 853, 721; 382/300; 386/50, 73; 395/2.74, 175; 375/377; 708/271, 276

[56] References Cited

U.S. PATENT DOCUMENTS

| | | | |
|---|---|---|---|
| 4,809,205 | 2/1989 | Freeman | 364/721 |
| 5,014,231 | 5/1991 | Reinhardt et al. | |
| 5,303,412 | 4/1994 | Kushner | |
| 5,321,642 | 6/1994 | Golberg | 364/721 |
| 5,467,294 | 11/1995 | Hu et al. | |
| 5,475,627 | 12/1995 | Inoue | 364/721 |
| 5,764,087 | 6/1998 | Clark | 327/105 |

OTHER PUBLICATIONS

A. Yamagishi, et al, A 2–V, 2–GHz Low–Power Direcy Digital Frequency Synthesizer Chip Set for Wireless Comunication, IEEE 1995 Custom Integrated Circuits Conference, pp. 319–322.

L. Tan, et al, A 200 MHZ Quadrature Digital Synthesizer/Mixer in 0.8 μm CMOS, "IEEE Journal of Solid State Circuits", vol. 30, No. 3, Mar. 1995, pp. 193–200.

H. Nicholas, III et al, A 150–MHZ Direct Frequency Synthesizer in 1.25–μm CMOS with –90–dBc Spurious Performance, "IEEE Journal of Solid–State Circuits", vol. 26, No. 12, Dec. 1991, pp. 1959–1969.

G. Chang, et al, WP 2.2: A Low–Power CMOS Digitally Synthesized 0–12 MHZ Agile Sinewave Generator, 1994 IEEE International Solid–State Circuits Conference, pp. 32–33.

*Primary Examiner*—Chi H. Pham
*Assistant Examiner*—Jean B Corrielus
*Attorney, Agent, or Firm*—Connolly Bove Lodge & Hutz LLP

[57] ABSTRACT

A direct digital frequency synthesizer for generating a digital sine or cosine function waveform receive digital input. Memory stores digital samples along portions of sine and cosine function waveforms. The memory outputs the digital samples in response to a first portion of the digital input. Control logic is responsive to the digital input and controls the output of the digital samples from the memory to allow digital samples along a complete cycle of the sine or cosine function waveform to be output even though only portions of the sine and cosine function waveforms are stored in the memory. A linear interpolator receives a second portion of the digital input and modifies digital samples output by the memory to generate intermediate digital samples between the digital samples stored in the memory to improve accuracy.

33 Claims, 4 Drawing Sheets

LOW-POWER DIRECT DIGITAL FREQUENCY SYNTHESIZER ARCHITECTURE

FIELD OF THE INVENTION

The present invention relates to synthesizers and in particular to a direct digital frequency synthesizer to generate digital sine function and/or cosine function waveforms.

BACKGROUND OF THE INVENTION

Digital frequency synthesizers are known in the art and typically include at least one look-up table which stores digital samples of the sine or cosine function waveform to be generated. In the past, large look-up tables have been used to store a large number of digital samples of the sine or cosine function waveform along a complete cycle of the waveform. The digital frequency synthesizers are responsive to input and output sequentially the digital samples stored in the look-up table thereby to output a complete cycle of the sine or cosine function waveform. The digital output of the synthesizer may of course be conveyed to an analog to digital converter to convert the digital output to analog form.

Although digital frequency synthesizers of this nature have allowed for the generation of high resolution sine or cosine function waveforms, the use of large look-up tables to store a large number of digital samples has maintained the power consumption levels of these digital frequency synthesizers relatively high. Accordingly, digital frequency synthesizers which reduce power consumption yet generate high resolution sine or cosine function waveforms are desired.

It is therefore an object of the present invention to provide a novel low power direct digital frequency synthesizer.

SUMMARY OF THE INVENTION

According to one aspect of the present invention there is provided a direct digital frequency synthesizer for generating a digital sine or cosine function waveform comprising:

input means to receive digital input;

memory storing digital samples along portions of sine and cosine function waveforms, said memory outputting said digital samples in response to said digital input; and control logic responsive to said digital input to control the output of said digital samples from said memory to allow digital samples representing a complete cycle of a sine or cosine function waveform to be output by said memory.

According to yet another aspect of the present invention there is provided a direct digital frequency synthesizer for generating a digital sine or cosine function waveform comprising:

input means to receive digital input;

memory storing digital samples along portions of sine and cosine function waveforms, said memory outputting said digital samples in response to a first portion of said digital input;

control logic responsive to said digital input to control the output of said digital samples from said memory to allow a complete cycle of said sine or cosine function waveform to be output by said memory; and linear interpolation means receiving a second portion of said digital input and being responsive to said control logic for generating intermediate digital samples between the digital samples stored in said memory.

The present invention provides advantages in that the overall power consumption of the digital frequency synthesizer is reduced as compared to prior art designs. This is achieved by using small look-up tables which store a few digital samples along only a portion of both sine and cosine function waveforms while still allowing a full cycle of a sine and/or cosine function waveform to be generated with minimum additional hardware. The digital frequency synthesizer uses linear interpolation during the full computation of the sine and/or cosine function waveform to increase the resolution of the sine and/or cosine function waveform being generated.

BRIEF DESCRIPTION OF THE DRAWINGS

Embodiments of the present invention will now be described more fully with reference to the accompanying drawings in which.

DESCRIPTION OF THE PREFERRED EMBODIMENTS

Figure 1:
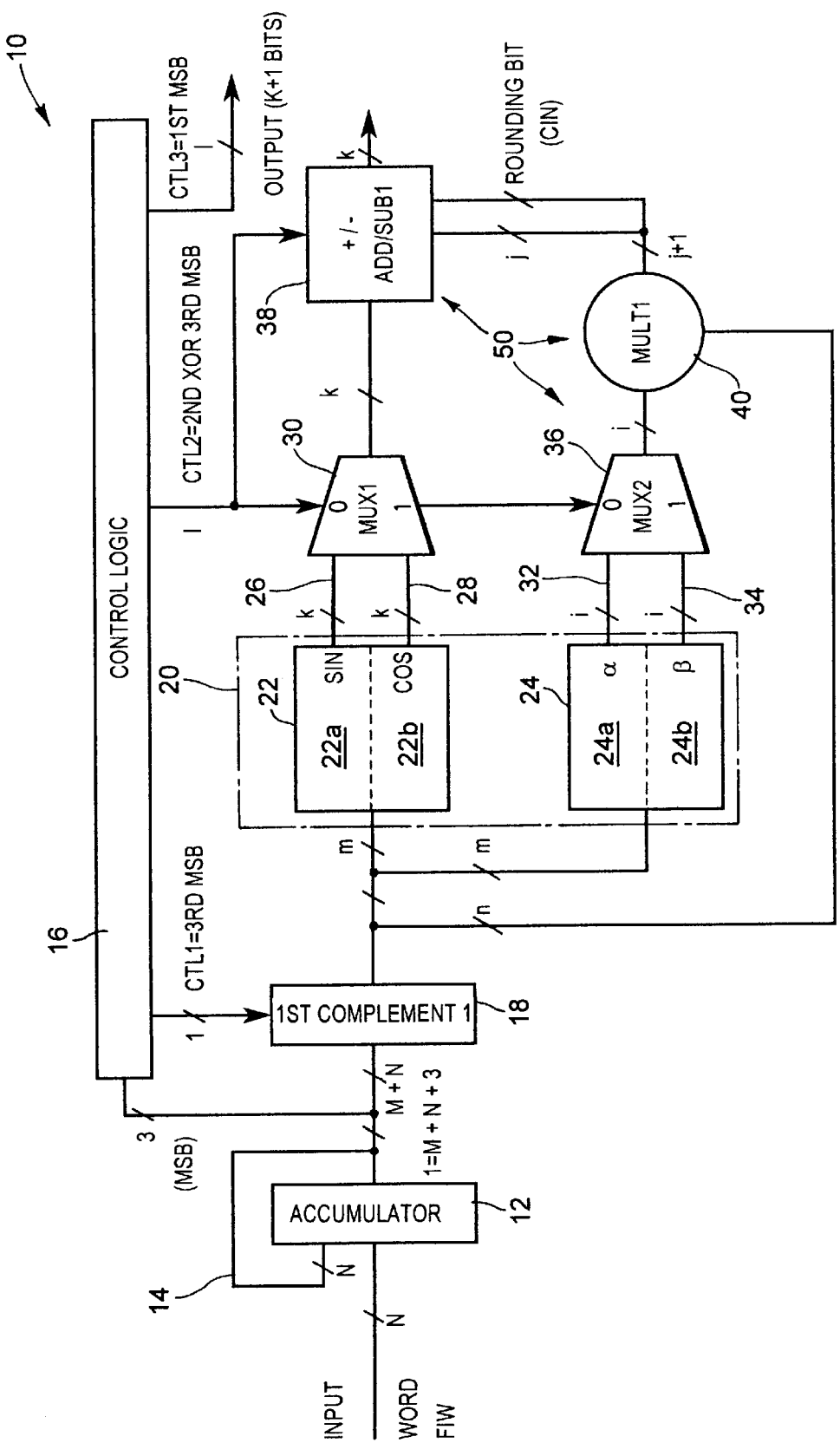
FIG. 1 is a schematic of a direct digital frequency synthesizer for generating a sine function waveform.

Referring now to FIG. 1, a direct digital frequency synthesizer (DDFS) for generating a digital representation of a synthesized waveform and in particular a sine function waveform is shown and is generally indicated to by reference numeral 10. As can be seen, DDFS 10 includes an N-bit accumulator 12 for receiving an N-bit digital input word. The output of the accumulator 12 is applied to itself as input via a feedback line 14. The three most significant bits (MSBs) of the accumulator output are also applied to control logic 16 while the remaining (m+n) bits of the accumulator output are applied to a 1st complement block 18.

1st complement block 18 also receives control input ctl1 from the control logic 16. The control input ctl1 is equal to the 3rd MSB of the 3 MSBs receiving by the control logic 16 from the accumulator 12. The output of the 1st complement block 18 is partitioned into m-most significant bits representing an address and n-least significant bits. The m-most significant bits are applied to the address bus of a read only memory (ROM) 20. The ROM 20 is partitioned into two separate memories 22 and 24 respectively.

Memory 22 is configured as a pair of look-up tables 22a and 22b respectively. One of the look-up tables 22a stores k-bit digital samples representing amplitude points along a portion of a sine function waveform from 0 to $\pi/4$. The other of the look-up tables 22b stores k-bit digital samples representing amplitude points along a portion of a cosine function waveform from 0 to $\pi/4$.

Memory 24 is also configured as a pair of look-up tables 24a and 24b respectively. One of the look-up tables 24a stores I-bit digital values of an interpolation coefficient $\alpha$, each interpolation coefficient $\alpha$ of which is associated with one of the digital samples stored in look-up table 22a. The other of the look-up tables 24b stores I-bit digital values of an interpolation coefficient $\beta$, each interpolation coefficient $\beta$ of which is associated with one of the digital samples stored in look-up table 22b.

Table 1 shows an example of the digital values and interpolation coefficients α and β stored in the look-up tables 22a, 22b, 24a and 24b for 10-bit accuracy. As can be seen, in this example only 16 digital samples for each portion of the sine and cosine function waveforms are stored in the look-up tables 22a and 22b. In Table 1, $\theta_0$ represents the (m+n) bit output of the 1st complement block 18. The 4-most significant bits represent the memory addresses.

Memory 22 is connected to two output data buses 26 and 28. The digital samples of the sine function waveform are output on data bus 26 when the appropriate memory locations of memory 22 are addressed. The digital samples of the cosine function waveform are output on data bus 28 when the appropriate memory locations are addressed.

The data busses 26 and 28 lead to a multiplexer 30 which selected one of the two data busses in response to control input ctl2 from the control logic 16. The control input ctl2 is equal to the 2nd MSB of the 3 MSBs received by the control logic 16 from the accumulator 12, X-ORed wit the 3rd MSB. The output of multiplexer 30 is conveyed to an adder/subtracter 38 which is also responsive to control input ctl2 from the control logic 16.

Memory 24 is also connected to two output data busses 32 and 34 respectively. The interpolation coefficients α are output on data bus 32 when the appropriate memory location of memory 24 are addressed while the interpolation coefficients β are output on data bus 34 when the appropriate memory locations are addressed. The data busses 32 and 34 lead to a multiplexer 36 which selects one of the two data busses 32 and 34 in response to the control input ctl2 from the control logic 16. The output of multiplexer 36 is conveyed to a multiplier 40.

The multiplier 40 also receives the n-least significant bits from the 1st complement block 18 and computes a (I+n) bit digital value equal to the product of the received interpolation coefficient and the n-least significant bits. The (j+1) most significant bits of the digital produce value generated by the multiplier 40 are used. The j-bit portion of the (j+1) most significant bits is applied to the adder/subtracter 38 and is added to or subtracted from the digital sample received by the adder/subtracter from the multiplexer 30 depending on the control input ctl2. The extra bit of the (j+1) most significant bits is used to round up or round down the output of the adder/subtracter 38.

The control logic 16 also outputs a control signal ctl3 equal to the 1st MSB of the 3 MSBs received by the control logic 16 from the accumulator 12. The control signal ctl3 is used as sign bit.

Prior to discussing the operation of the DDFS 10, the general principals upon which its operation is based will now be described. A complete cycle of a sine function waveform extends from 0 to 2π. A large look-up table is required if digital samples along the compete cycle of the sine function waveform are to be stored. In order to reduce the number of digital samples to be stored, the present invention makes use of the fact that symmetry exists between sine function and cosine function waveforms.

Specifically, the cosine function waveform from 0 to π/4 is equal to the sine function form π/2 to π/4. Since the look-up tables 22a and 22b store digital samples along the sine function waveform from 0 to π/4 and digital samples along the cosine function waveform from 0 to π/4, by first reading out sequentially the digital samples in look-up table 22a from beginning to end and then reading out sequentially the digital samples in look-up table 22b from the end to the beginning, digital samples along a sine function waveform from 0 to π/2 are output. If the contents of the two look-up tables 221a and 22b are read out again in the opposite manner, digital samples along a sine function waveform from π/2 to π are output. In order to output a complete cycle of the sine function waveform, the above steps need to be repeated and the sign of the control output ctl3 needs to be changed since the sine function waveform from π to 2π is the same as the sine function waveform from 0 to π but inverted.

In order to reduce memory requirements, a few digital samples of the sine function and cosine function waveforms are stored in the look-up tables 22a and 22b respectively. To improve accuracy, linear interpolation is used to generate intermediate digital samples between the digital samples stored in the look-up tables 22a and 22b respectively. The linear interpolation makes use of the following equations:

$$A \cdot \sin(\theta) = A \cdot \sin(\theta_0) + (\theta - \theta_0) + \delta_{sin} \quad (1)$$

$$A \cdot \cos(\theta) = A \cdot \cos(\theta_0) + \beta(\theta - \theta_0) + \delta_{cos} \quad (2)$$

where:
A is the amplitude of the sine function waveform;
$\sin(\theta_0)$ and $\cos(\theta_0)$ are the digital samples stored in the look-up tables 22a and 22b;
α and β are the interpolation coefficients stored in look-up tables 24a and 24b;
$(\theta = \theta_0)$ represents the n-least significant bits of the 1st complement block output; and
$\delta_{sin}$ and $\delta_{cos}$ represent approximation errors.

In equations (1) and (2), the terms $\delta_{sin}$ and $\delta_{cos}$ are residuals of the Taylor expansions for sine and cosine functions. By definition:

$$\delta_{sin} = -\frac{1}{2} A \cdot \sin(x_x)(x - x_x)^2; \text{ and} \quad (3)$$

$$\delta_{cos} = -\frac{1}{2} A \cdot \cos(x_x)(x - x_x)^2 \quad (4)$$

where:
$x_x$ is a point in the interpolation interval. Since sine and cosine functions are limited by 1, the following upper estimates defining the accuracy of the linear interpolation are valid:

$$|\delta_{sin}| = |\frac{1}{2} A \cdot (x - x_x)^2|; \text{ and} \quad (5)$$

$$|\delta_{cos}| = |\frac{1}{2} A \cdot (x - x_x)^2| \quad (6)$$

Taking into account that:

$$|(x - x_x)| \leq |(\theta - \theta_0)|_{max} = h$$

where:
h is the spacing between the digital samples in the look-up tables 22a and 22b, the spacing h in the present embodiment equals:

$$(\pi/4)/n$$

where:
n is equal to the number of digital samples stored in the look-up tables 22a and 22b for each portion of the sine and cosine function waveforms.

Thus, for example, if 16 digital samples of each portion along the sine and cosine function waveforms are stored in the look-up tables as illustrated in Table 1, h is equal to (π/4)16=0.049, giving $|\delta_{sin}| = |\delta_{cos}| = |\frac{1}{2} A \cdot (0.049)^2| = A \cdot 1.205 \times 10^{-3}$ or about 58 dBc.

Figure 4:
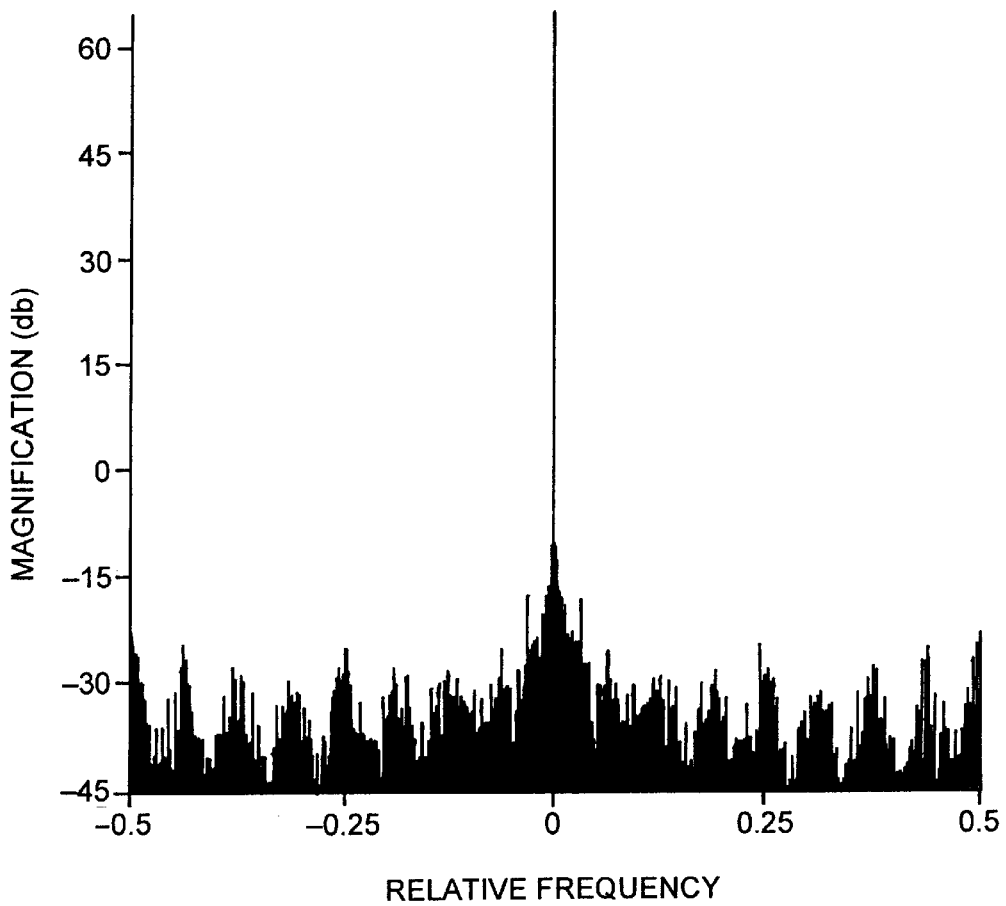
FIG. 4 is a graph showing the spurious performance of a 10-bit direct digital frequency synthesizer of the type illustrated in FIG. 1.

The multiplier 40, which receives the interpolation coefficients and β stored in the memory 24 and the n-least significant bits from the 1st complement block 18, computes the terms $(\theta-\theta_0)$ and $\beta(\theta-\theta_0)$ of equations (1) and (2). Since the terms $\delta_{sin}$ and $\delta_{cos}$ are small, they can be ignored without affecting the accuracy of the linear interpolation to any great extent. FIG. 4 shows an example of an FFT analysis of a DDFS 10 including 16 digital sample look-up tables 22a and 22b and look-up tables 24a and 24b.

The operation of the DDFS 10 will now be described. For the purpose of illustration only, the accumulator 12 will be described as receiving a digital one on each clock cycle so that the output of the accumulator increases by one after each clock cycle.

Each N-bit output of the accumulator 12 has its 3 MSBs conveyed to the control logic 16 and its remaining (m+n) bits conveyed to the 1st complement block 18. In this example, the (m+n) bits will be of the form shown in Table 1. The 1st complement block 18 complements the (m+n) bits received from the accumulator 12 with the 3rd MSB from the control logic 16 and partitions the (m+n) bit result into an m-bit address and n-least significant bits. The m-bit address is applied to the memories 22 and 24. When the memory 22 receives the m-bit address, it outputs the appropriate digital sample of the portion of the sine function waveform on data bus 26 and outputs the appropriate digital sample of the portion of the cosine function waveform on data bus 28. Similarly, when the memory 24 receives the m-bit address, it outputs the interpolation coefficient $\alpha$ on data bus 32 that is associated with the digital sample output on data bus 26 and outputs the interpolation coefficient $\beta$ on data bus 34 that is associated with the digital sample output on data bus 28.

The control logic performs the X-OR logic on the 2nd and 3rd MSBs of the accumulator output, to condition the multiplexer 30 so that it connects the appropriate data bus 26 or 28 to the adder/subtracter 38. The control logic 16 also conditions the multiplexer 36 so that it connects the appropriate data bus 32 or 34 to the multiplier 40.

The multiplier 40 which receives the n-least significant bits from the 1st complement block 18 and the interpolation coefficients $\alpha$ and $\beta$, calculates the interpolation value to be added to or subtracted from the output digital sample of the sine or cosine function waveform. The logic value of the control input ctl2 to the adder/subtracter 38 determines whether the interpolation value is added to or subtracted from the digital sample to generate the intermediate digital sample. Thus, memory 24 storing the interpolation coefficients $\alpha$ and $\beta$, multiplier 40 and adder/subtracter 38 function as a linear interpolator identified generally by reference numeral 50.

Since the m-most significant bits of the 1st complement block 18 output are used to address the memories 22 and 24, the address value conveyed to the memories changes only after every 32 clock cycles. Thus, the memories 22 and 24 output the same digital samples and interpolation co-efficients 32 times. Although this is the case, the n-least significant bits change by one each clock cycle resulting in a different interpolation value being generated by the multiplier 40 for each clock cycle. The interpolation value is combined with the digital sample output by the multiplexer 30 via adder/subtracter 38 before the digital sample is output by the DDFS 20. This allows a large number of intermediate digital samples between consecutive digital samples stored in the look-up tables 22a and 22b to be generated.

When the DDFS 10 is generating digital samples representing the sine function waveform from 0 to $\pi/4$, the 3 MSBs conveyed to control logic 16 have logic low values. The logic value of the 3rd MSB on control input Ctl1 determines whether the look-up tables 22a, 22b, 24a and 24b are read from beginning to end or from end to beginning. A logic low 3rd MSB results in the look-up tables being read from beginning to end while a logic high 3rd MSB results in the look-up tables being read from end to beginning. The 1st complement block 18 therefore, during generating of this portion of the sine function waveform, outputs addresses which cause the memories 22 and 24 to output the digital samples stored therein sequentially from beginning to end. The logic value of the control input ctl2 determines which of the look-up tables is to be used to generate the DDFS output. A logic low control input ctl2 selects look-up tables 22a and 24a while a logic high control input ctl2 selects look-up tables 22b and 24b. Therefore, the control logic 16 conditions the multiplexer 30 to connect data bus 26 to the adder/subtracter 38 and conditions the multiplexer 36 to connect the data bus 32 to the multiplier 40. This results in the digital samples stored in the look-up table 22a from beginning to end and intermediate digital samples between them being output by the DDFS 10.

When the accumulator output reaches the maximum address value of the memories 22 and 24, the 3rd MSB goes high. This causes the control logic 16 to condition the multiplexer 30 to connect the data bus 28 to adder/subtracter 38 and to condition multiplexer 36 to connect the data bus 34 to multiplier 40. The 1st complement block 18, which complements the 3rd MSB with the (m+n) bits, outputs addresses which cause the memories 22 and 24 to output the digital samples stored therein sequentially from end to beginning. This results in the digital samples stored in the look-up table 22b from end to beginning and intermediate digital samples between them being output by the DDFS 10 so that the sine function waveform from $\pi/4$ to $\pi/2$ is generated.

After the accumulator output has caused the 1st complement block 18 to cycle back through the memory addresses, the 3rd MSB goes low and the 2nd MSB goes high. The 1st complement block 18 once again begins outputting addresses which cause the memories 22 and 24 to output the digital samples stored therein sequentially from beginning to end. The logic high 2nd MSB causes the control logic 16 to condition the multiplexer 30 to connect the data bus 28 to adder/subtracter 38 and to condition multiplexer 36 to connect the data bus 34 to multiplier 40. This results in the digital samples stored in the look-up table 22b from beginning to end and the intermediate digital samples between them being output so that the sine function waveform from $\pi/2$ to $3\pi/4$ is generated.

After the accumulator output has caused the 1st complement block 18 to cycle through the memory addresses as stated above, the 3rd MSB goes high and the 2nd MSB remains high. This cases the 1st complement block 18 to output addresses which cause the memories 22 and 24 to output the digital samples stored therein sequentially from end to beginning. The logic high 2nd MSB and 3rd MSB cause the control logic 16 to condition multiplexer 30 to connect data bus 26 to the adder/subtracter 38 and to condition multiplexer 36 to connect data bus 32 to the multiplier 40. This results in the digital samples stored in the look-up table 22a from end to beginning and the intermediate digital samples between them being output so that the sine function waveform from $3\pi/4$ to $\pi$ is generated. During these steps, the logic value of the 1st MSB on control output ctl3 remains low.

In order to generate the second half of the sine function waveform from $\pi$ to $2\pi$, the above steps are repeated except that the 1st MSB on control output ctl3 goes high signifying that the sine function waveform is negative. Table 2 illustrates the values of the control logic output as the 3 MSBs change.

Figure 2:
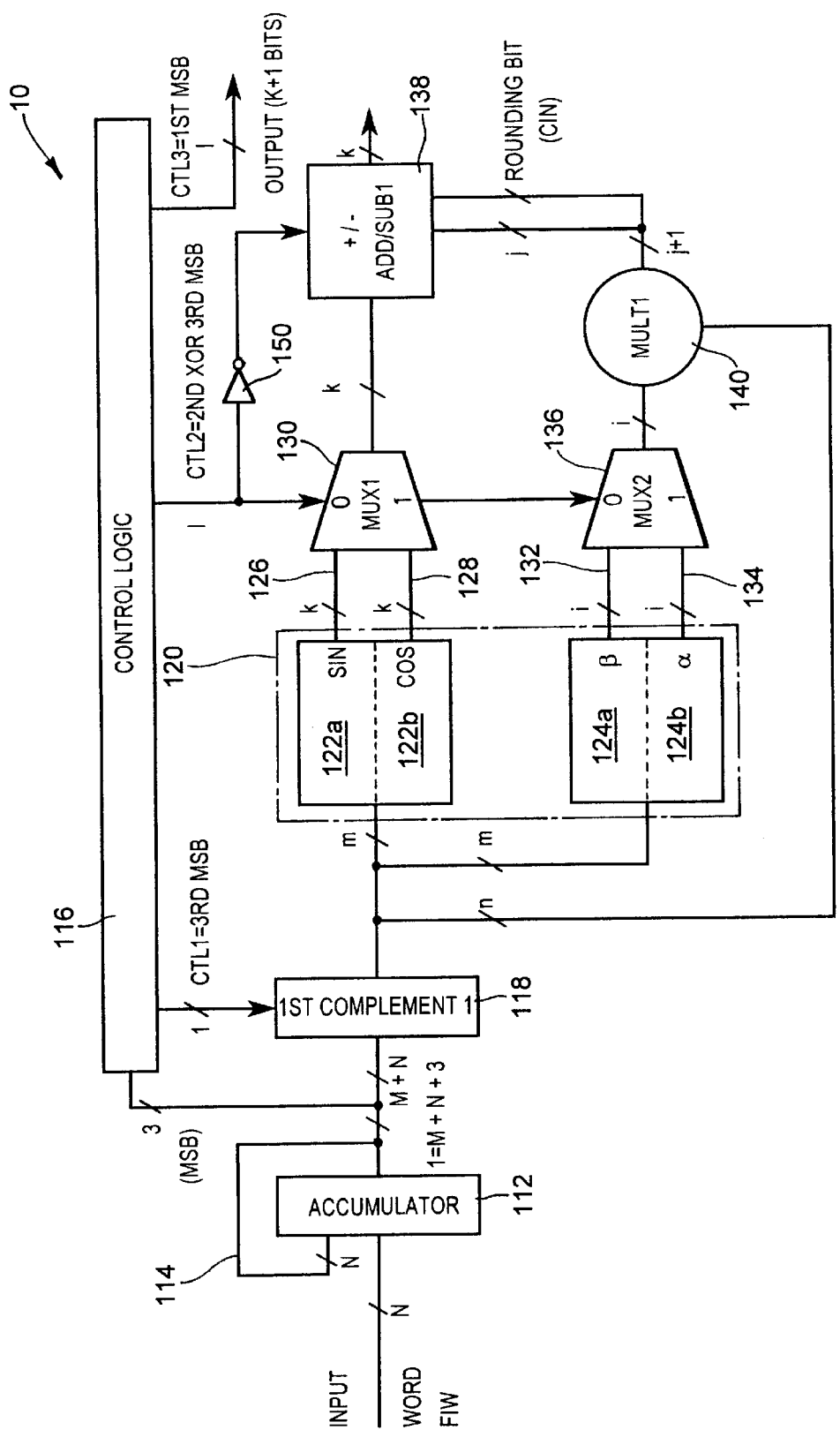
FIG. 2 is a schematic of a direct digital frequency synthesizer for generating a cosine function waveform.

Referring now to FIG. 2, a direct digital frequency synthesizer (DDFS) for generating a digital representation of a cosine function waveform is shown and is generally indicated to by reference numeral 100. DDFS 100 is basically the same as the DDFS 10 of the previous embodiment except that the address locations of the sine and cosine look-up tables 122a and 122b and the address locations of the look-up tables 1245a and 124b are reversed, the control input ctl2 is inverted by an inverter 150 before it is applied to the adder/subtracter 128 and the control signal crtl3 generated by the control logic is equal to the 1st MSB of the 3 MSBs received by the control logic 116 from the accumulator 112 X-ORed with the 2nd MSB.

The operation of the DDFS 100 is very similar to the operation of the DDFS 10. When a cosine function waveform is to be generated by the DDFS 100, the digital samples in the look-up table 122a and the intermediate digital samples between them are output sequentially from beginning to end representing a cosine function waveform 0 to π/4. In this case, the 1st MSB on control input ctl3 is a logic low.

Once this portion of the cosine function waveform has been output by the DDFS 100, the digital samples in the look-up table 122b from end to beginning and the intermediate digital samples between them are output so that the cosine function waveform from π/4 to π2 is generated. After this, the digital samples in the look-up table 122b from beginning to end and the digital samples between them are output so that the cosine function waveform from π/2 to 3π/4 is generated. At this time, the 1st MSB on control output ctl3 goes to a logic high signifying that the cosine function waveform is negative.

The digital samples in the look-up table 122a from end to beginning and the intermediate digital samples between them are then output so that the cosine function waveform from 3π/2 to π is generated. In this case, the 1st MSB on control output ctl3 remains as a logic high.

The above steps are then reperformed to generate the cosine function waveform from π to 2π with the exception that the 1st MSB on control output ctl3 is opposite form the value during generation of the first half of the cosine function waveform. Table 3 illustrates the values of the control logic output as the 3 MSBs change.

Figure 3:
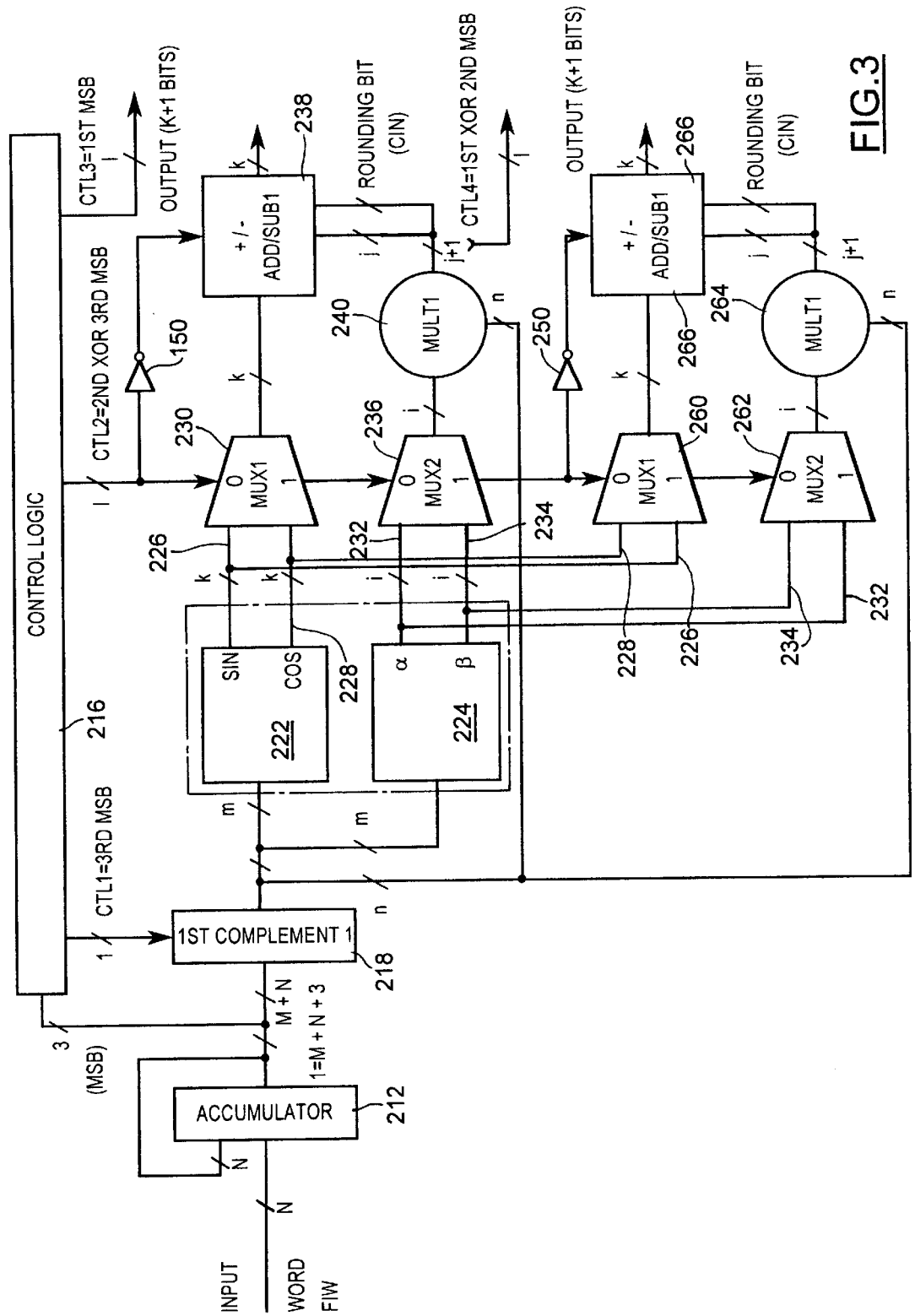
FIG. 3 is a schematic of a direct digital frequency synthesizer for generating sine and cosine function waveforms.

Referring now to FIG. 3, a direct digital frequency synthesizer (DDFS) for generating a digital representation of both sine and cosine function waveforms is shown and is generally indicated to by reference numeral 200. The DDFS is a straightforward combination of the two DDFS's 10 and 100 illustrated in FIGS. 1 and 2. As can be seen, the DDFS includes two additional multiplexers 260 and 262, one additional multiplier 264, one additional adder/subtracter 266 and an inverter 250 in order to generate the cosine function waveform in parallel with the generation of the sine function waveform.

Although the DDFS has been described as receiving input equal to a digital one, it should be apparent that other digital values can be selected. The selected digital value will of course determine the number of intermediate digital samples generated by the DDFS.

As those of skill in the art will appreciate, the present invention allows for the generation of sine and cosine function waveforms while reducing power consumption. It will be appreciated by those of skill in the art that modifications and variations may be made to the present invention without departing from the scope there of as defined by the appended claims.

We claim:

1. A direct digital frequency synthesizer for generating a digital sine or cosine function waveform comprising:

first memory storing digital samples representing amplitude points along portions of sine and cosine function waveforms, said first memory outputting said digital samples in response to incrementing digital input;

control logic responsive to said incrementing digital input to control the digital samples output by said first memory so that digital samples along a cycle of a sine or cosine function waveform are output by said first memory; and a linear interpolator responsive to said incrementing digital input and to said control logic to generate intermediate digital samples between digital samples stored in said first memory, the digital samples in said first memory and said intermediate digital samples being output in order along the cycle of said sine or cosine function waveform being generated.

2. The direct digital frequency synthesizer as defined in claim 1 wherein said first memory stores digital samples along said sine function waveform from 0 to π/4 and along said cosine function waveform 0 to π/4.

3. The direct digital frequency synthesizer as defined in claim 2 wherein said linear interpolater includes second memory storing digital values of interpolation co-efficients, each interpolation co-efficient being associated with one of the digital samples stored in said first memory, said second memory outputting digital values in response to a first portion of said incrementing digital input, said digital values being multiplied by a second portion of said incrementing digital input and the resulting products being used to modify digital samples output by said first memory thereby to generate said intermediate digital samples.

4. The direct digital frequency synthesizer as defined in claim 3 wherein the digital samples of the sine and cosine waveforms are stored in look-up tables, a digital sample in each look-up table being output by said first memory in response to an address from said control logic, said direct digital frequency synthesizer including switch means actuable to convey appropriate digital samples to said linear interpolater.

5. A direct digital frequency synthesizer as defined in claim 7 wherein said switch means is in the form of a multiplexer.

6. A direct digital frequency synthesizer for generating a digital sine or cosine function waveform comprising:

input means to receive digital input and outputting incrementing addresses;

first memory storing digital samples representing amplitude points along portions of sine and cosine function waveforms, said first memory outputting said digital samples in response to a first portion of said incrementing addresses;

control logic responsive to said incrementing addresses to control the digital samples output by said first memory so that digital samples along a cycle of said sine or cosine function waveform are output by said first memory; and linear interpolation means receiving a second portion of said incrementing address and being responsive to said control logic for generating intermediate digital samples between digital samples stored in said first memory, the digital samples in said first memory and said intermediate digital samples being output in order along the cycle of said sine or cosine function waveform being generated.

7. The direct digital frequency synthesizer as defined in claim 6 wherein said first memory stores digital samples along a sin function waveform from 0 to $\pi/4$ and along a cosine function waveform 0 to $\pi/4$.

8. The direct digital frequency synthesizer as defined in claim 7 wherein said linear interpolation means includes second memory storing digital values of interpolation co-efficients, each interpolation co-efficient being associated with one of the digital samples stored in said first memory, said second memory outputting digital values in response to said first portion of said incrementing addresses, said digital values being multiplied by said second portion and the resulting products being used to modify digital samples output by said first memory thereby to generate said intermediate digital samples.

9. The direct digital frequency synthesizer as defined in claim 8 wherein the digital samples of the sine and cosine function waveforms are stored in look-up tables, a digital sample in each look-up table being output by said first memory in response to said first portion, said direct digital frequency synthesizer including switch means actuable to convey the appropriate digital sample to said linear interpolation means.

10. A direct digital frequency synthesizer for generating a synthesized digital waveform comprising:
   an accumulator receiving digital input and generating incrementing digital output;
   first memory storing sine and cosine digital samples representing amplitude points along portions of sine and cosine function waveforms and receiving digital output of said accumulator;
   control logic in communication with said accumulator and controlling the sine and cosine digital samples output by said first memory in response to said incrementing digital output so that digital samples along a cycle of said digital waveform to be generated are output in sequence; and
   a linear interpolator to modify selected sine and cosine digital samples output by said first memory to generate intermediate digital samples between successive digital samples stored in said first memory, wherein said first memory outputs each sine and cosine digital sample a plurality of consecutive times in response to said control logic and wherein said linear interpolator modifies each identical consecutively output digital sample differently thereby to generate said intermediate digital samples, the digital samples in said first memory and said intermediate digital samples being output in order along the cycle of said sine or cosine function waveform being generated.

11. The direct digital frequency synthesizer as defined in claim 10 wherein the value of said digital input to said accumulator determines the number of consecutive times the sine and cosine digital samples are output by said first memory.

12. The direct digital frequency synthesizer as defined in claim 11 wherein said first memory stores digital samples of a sine function waveform from 0 to $\pi/4$ and digital samples of a cosine function waveform from 0 to $\pi/4$.

13. The direct digital frequency synthesizer as defined in claim 12 wherein said linear interpolator includes a second memory storing interpolation coefficients, each of said interpolation coefficients being associated with a respective one of said sine and cosine digital samples.

14. The direct digital frequency synthesizer as defined in claim 13 wherein said linear interpolator modifies selected sine digital samples by adding or subtracting the value $(\theta-\theta_0)$ and modifies selected cosine digital samples by adding or subtracting the value $\beta(\theta-\theta_0)$, wherein and $\beta$ are said interpolation coefficients and wherein $(\theta-\theta_0)$ is equal to the n least significant bits of the incrementing digital output of said accumulator.

15. The direct digital frequency synthesizer as defined in claim 14 wherein said linear interpolator includes a multiplier receiving said n least significant bits and said interpolation co-efficients and an adder/subtractor responsive to said control logic and adding to or subtracting products generated by said multiplier from sine and cosine digital samples output by said first memory.

16. The direct digital frequency synthesizer as defined in claim 15 further including a complement block interposed between said accumulator and said first and second memories, said control logic receiving the 3 most significant bits of said incrementing digital output and said complement block receiving the remaining m+n bits of said incrementing digital output, said complement block being responsive to a control signal from said control logic equal to said $3^{rd}$ most significant bit.

17. The direct digital frequency synthesizer as defined in claim 16 wherein said first memory includes a sine digital sample look-up table and a cosine digital sample look-up table and wherein said second memory includes an interpolation coefficient look-up table and a $\beta$ interpolation coefficient look-up table, said first and second memories receiving m bits of said incrementing digital output and outputting corresponding sine and cosine digital samples and associated and $\beta$ interpolation coefficients, said direct digital frequency synthesizer further including switch means responsive to said control logic to convey the appropriate digital sample to said adder/subtractor and the associated interpolation coefficient to said multiplier.

18. The direct digital frequency synthesizer as defined in claim 17 wherein said switch means includes a first multiplexer interposed between said first memory and said adder/subtractor and a second multiplexer interposed between said second memory and said multiplier.

19. The direct digital frequency synthesizer as defined in claim 18 wherein said synthesized waveform is a sine function waveform and wherein said first and a second multiplexer and said adder/subtractor are responsive to a second control signal from said control logic equal to the $2^{nd}$ most significant bit of said incrementing digital output XOred with said $3^{rd}$ most significant bit, the most significant bit of said incrementing digital output being output by said control logic and representing a sign bit.

20. The direct digital frequency synthesizer as defined in claim 18 wherein said synthesized waveform is a cosine function waveform and wherein said first and second multiplexer are responsive to a second control signal from said control logic equal to the $2^{nd}$ most significant bit of said incrementing digital output XOred with said $3^{rd}$ most significant bit and wherein said added/subtractor is responsive to an inverted second control signal, said control logic generating a sign bit equal to the most significant bit of said incrementing digital output XOred with said $2^{nd}$ most significant bit.

21. A direct digital frequency synthesizer for generating a synthesized digital waveform comprising:
   an accumulator receiving digital input and generating incrementing digital output;
   a complement block receiving m+n of said incrementing digital output;

first memory storing sine and cosine digital samples representing amplitude points along portions of sine and cosine function waveforms and receiving m bits of said incrementing digital output from said complement block;

second memory storing interpolation coefficient, each interpolation coefficient being associated with a respective one of said sine and cosine digital samples, said second memory also receiving said m bits of said incrementing digital output from said complement block;

control logic receiving the 3 most significant bits of said incrementing digital output, said control logic supplying a first control signal to said complement block equal to said $3^{rd}$ most significant bit to control the sine and cosine digital samples output by said first memory so that digital samples along a cycle of said digital waveform to be generated are output in sequence, said control logic further controlling the output of said associated interpolation coefficients; and a linear interpolator receiving n least significant bits of said incrementing digital output from said $1^{st}$ complement block and said interpolation coefficients output by said second memory, said linear interpolator modifying selected sine and cosine digital samples output by said first memory in response to said n-bits and said interpolation coefficients to generate intermediate digital samples between successive digital samples stored in said first memory, the digital samples in said first memory and said intermediate digital samples being output in order along the cycle of said sine or cosine function waveforms being generated.

22. A direct digital frequency synthesizer as defined in claim 21 wherein said first memory outputs each sine and cosine digital sample a plurality of consecutive times in response to said control logic and wherein said linear interpolator modifies each identical consecutively output digital sample differently thereby to generate said intermediate digital samples, the number of consecutive times each digital sample is output being determined by the value of said digital input to said accumulator.

23. The direct digital frequency synthesizer as defined in claim 22 wherein said first memory stores digital samples of a sine function waveform from 0 to $\pi/4$ and digital samples of a cosine function waveform from 0 to $\pi/4$.

24. The direct digital frequency synthesizer as defined in claim 23 wherein said linear interpolator modifies selected sine digital samples by adding or subtracting the value $(\theta-\theta_0)$ and modifies selected cosine digital samples by adding or subtracting the value $\beta(\theta-\theta_0)$, wherein and $\beta$ are said interpolation coefficients and wherein $(\theta-\theta_0)$ is equal to said n least significant bits.

25. The direct digital frequency synthesizer as defined in claim 24 wherein said linear interpolator includes a multiplier receiving said n least significant bits and said interpolation coefficients and an adder/subtractor responsive to said control logic and adding to or subtracting products generated by said multiplier from sine and cosine digital samples output by said first memory.

26. The direct digital frequency synthesizer as defined in claim 25 wherein said first memory includes a sine digital sample look-up table and a cosine digital sample look-up table and wherein said second memory includes an interpolation coefficient look-up table and a $\beta$ interpolation coefficient look-up table, said first and and second memories receiving said m bits of said incrementing digital output and outputting corresponding sine and cosine digital samples and associated and $\beta$ interpolation coefficients, said direct digital frequency synthesizer further including switch means responsive to said control logic to convey the appropriate digital sample to said adder/subtractor and the associated interpolation coefficient to said multiplier.

27. The direct digital frequency synthesizer as defined in claim 26 wherein said switch means includes a first multiplexer interposed between said first memory and said adder/subtractor and a second multiplexer interposed between said second memory and said multiplier.

28. The direct digital frequency synthesizer as defined in claim 27 wherein said synthesized waveform is a sine function waveform and wherein said first and second multiplexer and said adder/subtractor are responsive to a second control signal from said control logic equal to the $2^{nd}$ most significant bit of said incrementing digital output XOred with said $3^{rd}$ most significant bit, the most significant bit of said incrementing digital output being output by said control logic and representing a sign bit.

29. The direct digital frequency synthesizer as defined in claim 27 wherein said synthesized waveform is a cosine function waveform and wherein said first and second multiplexer are responsive to a second control signal from said control logic equal to the $2^{nd}$ most significant bit of said incrementing digital output XOred with said $3^{rd}$ most significant bit and wherein said adder/subtractor is responsive to an inverted second control signal, said control logic generating a sign bit equal to the most significant bit of said incrementing digital output XOred with said $2^{nd}$ most significant bit.

30. A direct digital frequency synthesizer for generating a synthesized digital waveform comprising:

an accumulator receiving digital input and generating incrementing digital output;

a complement block receiving m+n bits of said incrementing digital output;

a first look-up table storing sine digital samples representing amplitude points along a sine function waveform from 0 to $\pi/4$ and receiving m bits of said incrementing digital output from said complement block;

a second look-up table storing cosine digital samples representing amplitude points along a cosine function waveform from 0 to $\pi/4$ and receiving said m bits of said incrementing digital output;

a third look-up table storing interpolation coefficient, each interpolation coefficient being associated with a respective one of said sine digital samples, said third look-up table receiving said m bits of said incrementing digital output;

a fourth look-up table storing $\beta$ interpolation coefficients, each $\beta$ interpolation coefficient being associated with a respective one of said cosine digital samples, said fourth look-up table receiving said m bits of said incrementing digital output, said first and second look-up tables outputting sine and cosine digital samples and said third and fourth look-up tables outputting associated and $\beta$ interpolation coefficients in response to said m bits of said incrementing digital output;

control logic receiving the 3 most significant bits of said incrementing digital output, said control logic supplying a first control signal to said complement block equal to said $3^{rd}$ most significant bit;

an adder/subtractor responsive to said control logic and receiving one of the sine and cosine digital samples output by said first and second look-up tables;

a multiplier receiving the n least significant bits of said incrementing digital output and one of the and β interpolation coefficients output by said third and fourth look-up tables and generating the product thereof, said product being applied to said adder/subtractor; and switch means responsive to said control logic to convey said one sine and cosine digital sample to said adder/subtractor and said one and β interpolation coefficient to said multiplier.

31. The direct digital frequency synthesizer as defined in claim 30 wherein said switch means includes a first multiplexer interposed between said first and second look-up tables and said adder/subtractor and a second multiplexer interposed between said third and fourth look-up tables and said multiplier.

32. The direct digital frequency synthesizer as defined in claim 31 wherein said synthesized waveform is a sine function waveform and wherein said first and second multiplexer and said adder/subtractor are responsive to a second control signal from said control logic equal to the $2^{nd}$ most significant bit of said incrementing digital output XOred with said $3^{rd}$ most significant bit, the most significant bit of said incrementing digital output being output by said control logic and representing a sign bit.

33. The direct digital frequency synthesizer as defined in claim 31 wherein said synthesized waveform is a cosine function waveform and wherein said first and second multiplexer are responsive to a second control signal from said control logic equal to the $2^{nd}$ most significant bit of said incrementing digital output XOred with said $3^{rd}$ most significant bit and wherein said adder/subtractor is responsive to an inverted second control signal, said control logic generating a sign bit equal to the most is significant bit of said incrementing digital output XOred with said $2^{nd}$ most significant bit.

* * * * *